Jan 6, 1931.  L. A. JONES  1,787,825
MOTION PICTURE AND SOUND FILM WITH POSITION INDICATION
Filed May 6, 1929
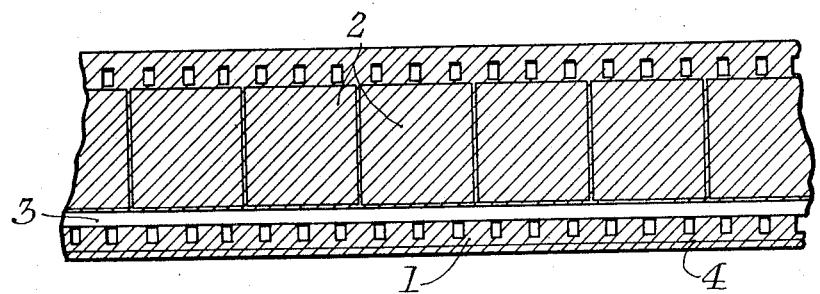
INVENTOR
LOYD A. JONES
BY
ATTORNEY Patented Jan. 6, 1931

1,787,825

UNITED STATES PATENT OFFICE

LOYD A. JONES, OF ROCHESTER, NEW YORK, ASSIGNOR TO EASTMAN KODAK COMPANY, OF ROCHESTER, NEW YORK, A CORPORATION OF NEW YORK

MOTION-PICTURE AND SOUND FILM WITH POSITION INDICATION

Application filed May 6, 1929. Serial No. 360,823.

This invention relates to photographic films having areas unequally absorptive of light and designating means for indicating the position of one of said areas.

It is now the usual practice to tint motion picture positive film to present certain pleasing effects when the film is projected on a screen but since many of these tints interfere with the reproduction of sound accompaniment from a sound record carried on the film, it has been proposed to tint only the motion picture exposure areas of the film while leaving the sound record or sound track portion of the film untinted. In using such film in a room illuminated with the usual orange or red dark room illuminants it is very difficult in the case of certain tints to determine the location of the untinted sound track.

In accordance with one feature of the present invention it is, therefore, proposed to provide a designation medium along the strip of film to indicate the location of the sound track area.

Another feature of the invention is the use of a line along one margin of the film to indicate the location of the sound record, the color of this line being such that it is readily visible under the colored light by which the film is to be observed.

For a clearer understanding of the invention reference is made to the drawing in which there is represented a strip of motion picture film generally designated 1 having motion picture areas 2 which may be tinted with any suitable tint and a sound track portion 3 which is left untinted. When the motion picture exposure areas 2 are tinted with yellow, red, amber or similar colors, it is especially difficult in a dark room illuminated with orange or red light to distinguish the location of the untinted sound track. It is proposed, therefore, to place an identification mark consisting of a very narrow line 4 running along the extreme outside edge of the film nearest to the sound track. This line may be black, blue or any color which shows a marked contrast to the remainder of the tinted film when viewed under illuminants of the color or colors used in printing and processing rooms where the film must be manipulated. This line may be of any desirable and convenient width but a line about one-half mm. is suggested as adequate for identifying the edge near which the sound track is located.

The location of the designation line just given is the preferred form but it will be understood that it may be placed on any portion of the film where it will not obscure any part of the motion picture exposure areas or the sound track portion.

While I have referred in this description to the designating line it will be understood that the invention includes the use of dots, letters, symbols or other designations of the contrasting colors specified which are placed at frequent intervals along any suitable portion of the photographic film.

What I claim is:

1. A photographic film having a series of tinted motion picture exposure areas and an untinted sound record area and designating means on said film adjacent the sound record area and extending substantially throughout the length thereof, said designating means being of a color of marked contrast to the color of the tinted areas.

2. A photographic film, comprising a support having a series of tinted motion picture exposure areas and an untinted sound record area, and a designating line carried by said support adjacent said sound record area, said line being of a color in marked contrast to that of the tinted exposure areas.

3. A photographic film comprising a support bearing tinted motion picture exposure areas and an untinted sound record area, said support having a series of perforations along each margin, and a fine line carried by the film between the sound record area and the margin of the film nearest the sound record area, said line being of a color contrasting with that of the tinted exposure areas.

Signed at Rochester, New York, this 1st day of May, 1929.

LOYD A. JONES.